June 4, 1963 K. T. GUY ET AL 3,092,132
COMPRESSED AIR OR OTHER GAS CONTROL VALVES
Filed May 15, 1961 4 Sheets-Sheet 3

United States Patent Office 3,092,132
Patented June 4, 1963

3,092,132
COMPRESSED AIR OR OTHER GAS CONTROL VALVES
Kenneth Theodore Guy, Marston Green, and Robert Walter Chandler, Solihull, England, assignors to Rotax Limited, Willesden, London, England
Filed May 15, 1961, Ser. No. 110,034
3 Claims. (Cl. 137—219)

This invention relates to valves for controlling compressed air (or other gas), and has for its object to provide such a valve in a form adapted to control the delivery pressure of the air.

A valve in accordance with the invention comprises in combination a hollow body having an inlet and an outlet at opposite sides respectively, a relatively fixed hollow cylindrical casing extending into the inlet, the end of the casing remote from the body being closed, whilst the end adjacent the body defines therewith a gap or gaps through which air can flow from the inlet to the outlet, a valve closure member shaped to divide the interior of the casing into two compartments, said member being movable between a closed position in which it covers said gap or gaps, and an open position wherein the gap or gaps are uncovered, valve means whereby one of the compartments can be placed alternatively in communication with the inlet or with atmosphere, a spring loaded tubular part having formed or mounted thereon a piston co-acting with a cylindrical surface of the body, said part being movable against its spring in an opposite direction to said member by the pressure of air admitted to said one compartment from the inlet to establish communication between the other compartment and the outlet, and means whereby air from the inlet can enter said other compartment at a restricted rate.

Figure 1:
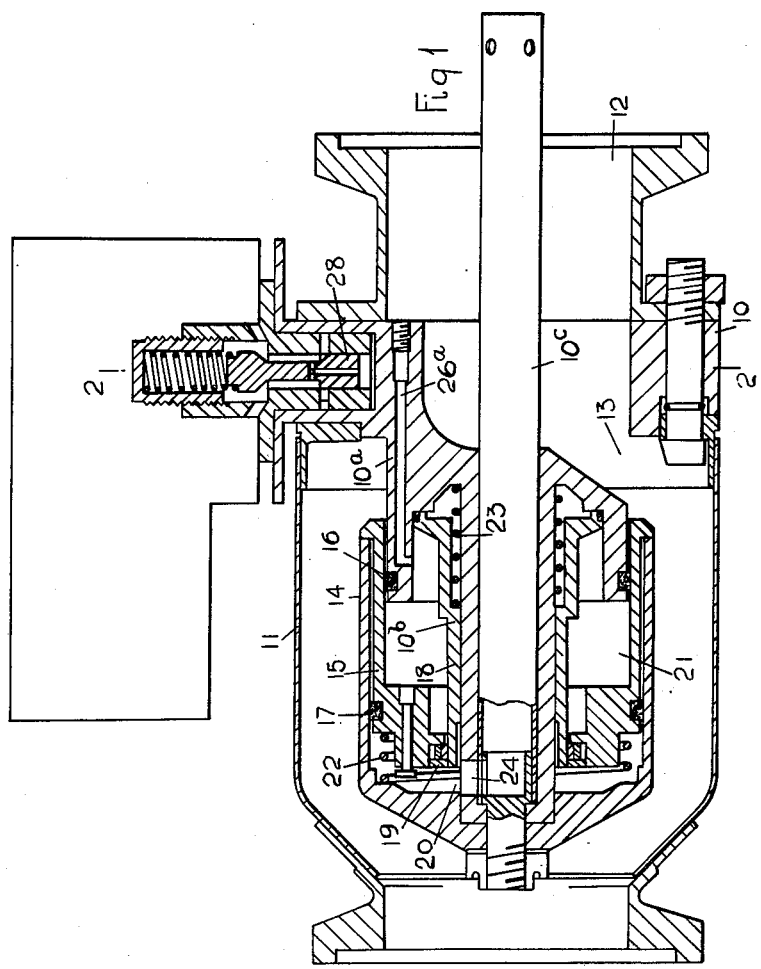
Figure 3:
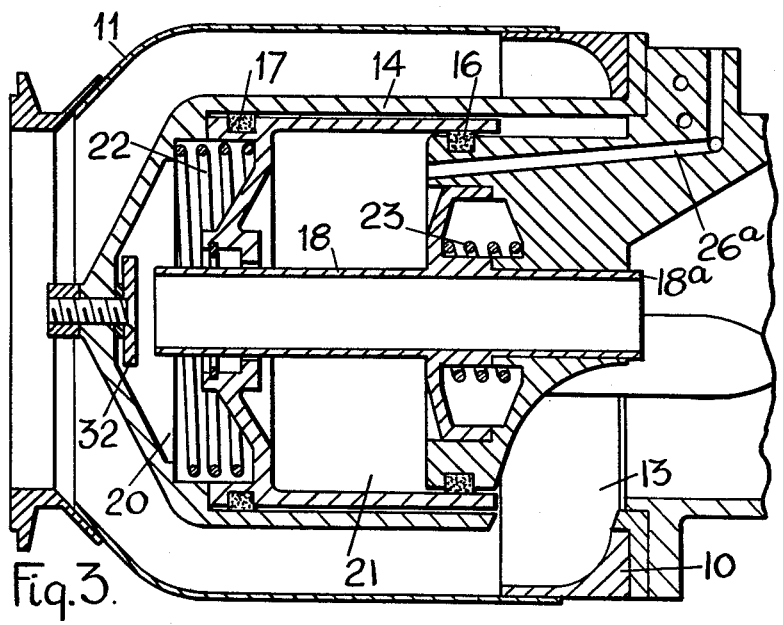
Figure 5:
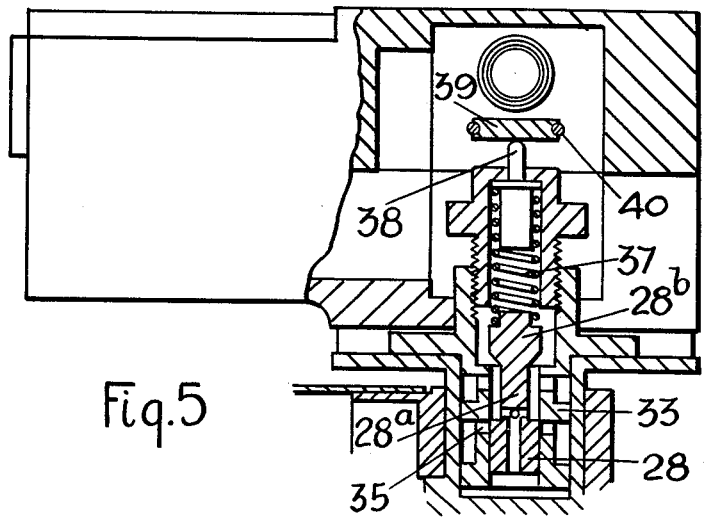
Figure 4:
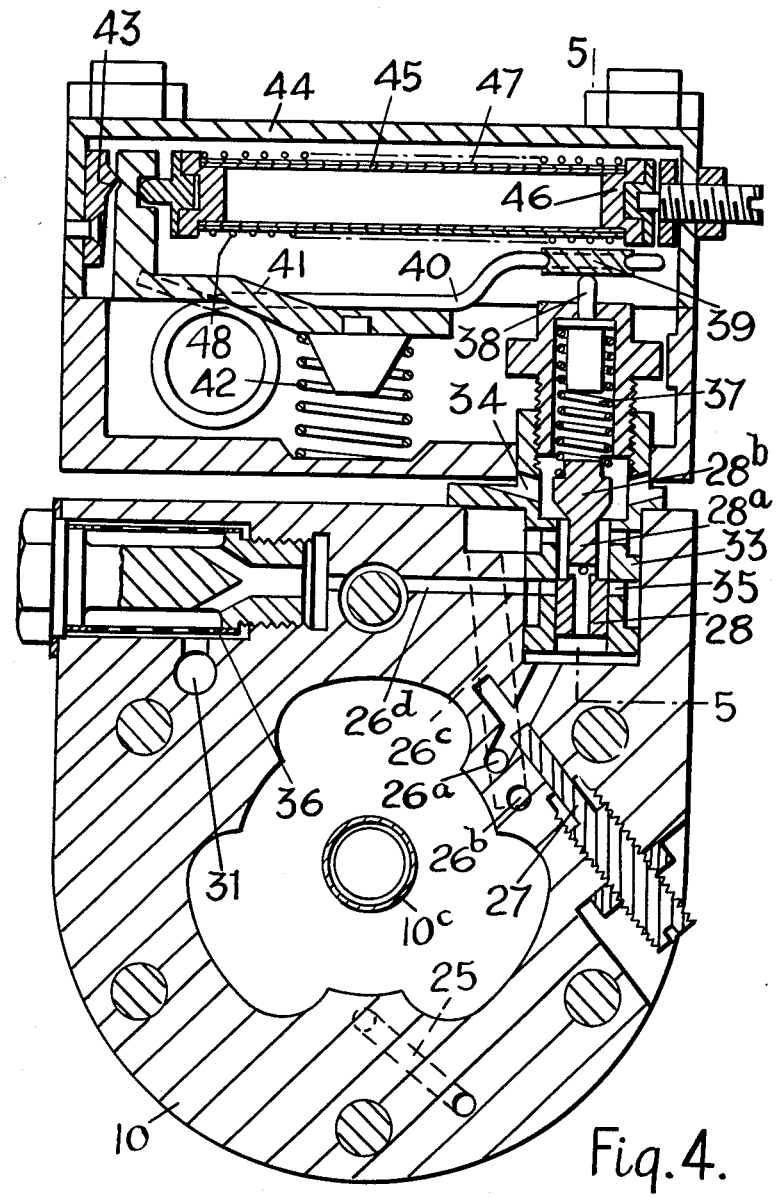

In the accompanying drawings:
FIGURE 1 is a sectional side view taken on the line 1—1 of FIGURE 2 showing one example of the invention,
FIGURE 2 is a section on the line 2—2 of FIGURE 1,
FIGURE 3 is a fragmentary view similar to FIGURE 1 but shows a modified example,
FIGURE 4 is a view similar to FIGURE 2 showing a further modification and,
FIGURE 5 is a fragmentary sectional view on the line 5—5 of FIGURE 4.

Figure 2:
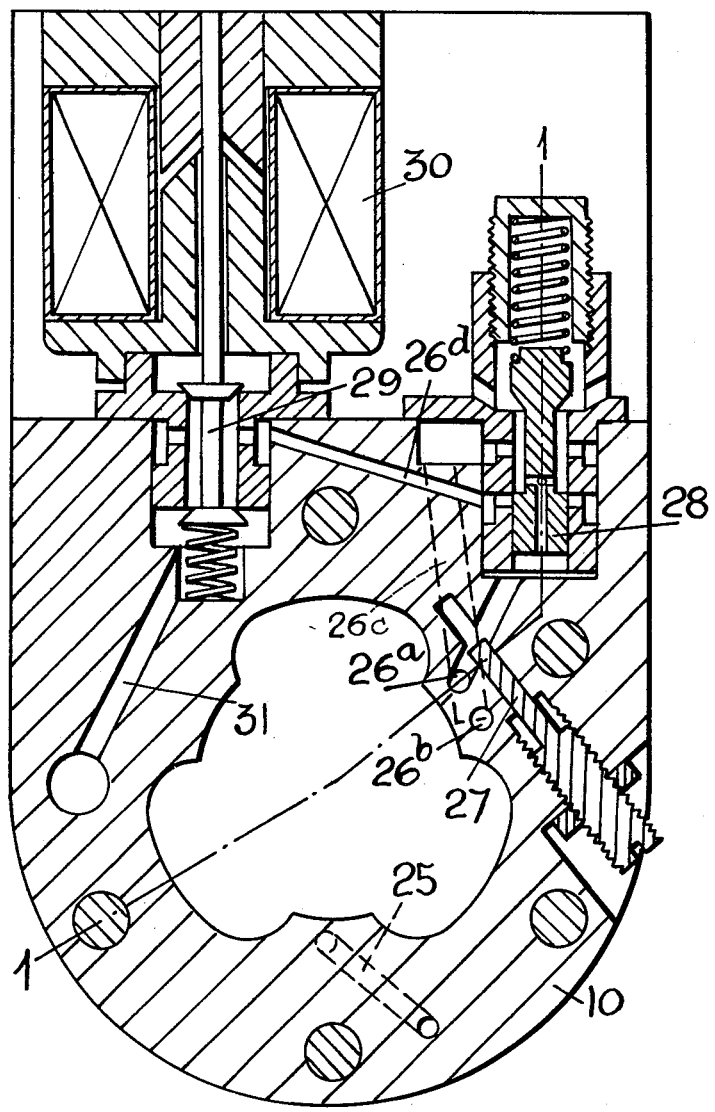

Referring first to the example of the invention illustrated in FIGURES 1 and 2 there is provided a hollow body 10 having an inlet 11 secured to its one side and an outlet 12 secured to its opposite side. Extending from the body into the inlet is a cylindrical part 10$^a$ in which are formed angularly spaced ports 13 (one only of which is shown) through which air can flow to the outlet, whilst concentrically disposed within the cylindrical part 10$^a$ is a hollow and integral cylindrical stem 10$^b$. Secured to the outer end of the stem is a closed end of a cylindrical casing 14 which is surrounded in spaced relationship by the inlet 11.

Within the casing 14 is a valve closure member 15 in the form of an annular skirted piston. The skirt of the member 15 is slidable over the cylindrical part 10$^a$ of the body through an annular gap between this part and an open end of the casing 14, a sealing ring 16 being provided between the skirt and the part 10$^a$ and a further seal 17, which permits of a restricted air flow, being provided between the member 15 and the casing 14. The internal periphery of the annular head of the member 15 is slidable upon a sleeve 18 which is in turn slidable on the stem 10$^b$, a sealing ring 19 being provided between the member and sleeve. The member 15 thus serves to divide the casing 14 internally into two compartments 20 and 21.

The closure member 15 is loaded by a coiled compression spring 22 acting between its head and the closed end of the casing, towards a closed position in which its skirt covers the ports 13. Moreover, the sleeve 18 on which is formed or mounted an annular piston co-operating with the internal cylindrical surface of the part 10$^a$ of the body, is loaded in the opposite direction by a spring 23 so as to cover a port 24 in the stem through which the compartment 20 is in communication with the outlet. Conveniently, a tube 10$^c$ is fixed within the stem 10$^b$ and extends to a position well down stream of the body 10 so that when the port 24 is uncovered the compartment 20 shall not be subjected to false pressures resulting from the issuance of the air through the ports 13.

The space between the piston on the sleeve 18 and the body 10 is vented to atmosphere at all times through a passage 25 in the body, whilst opening from the compartment 21 are a pair of passages 26$^a$, 26$^b$. The passage 26$^a$ incorporates a restricting valve 27 and is in communication with the one end of a chamber containing a spring loaded relief valve 28 having a head 28$^b$ which can seat in the opposite end of the chamber. Both the passages 26$^a$ and 26$^b$ are also in communication with the opposite end of the chamber adjacent the seating, through a passage 26$^c$; whilst a further passage 26$^d$ opening into the chamber intermediate its ends, communicates with a chamber containing a spring loaded valve 28 operable by a solenoid 30. When the solenoid is de-energised and the valve is in the alternative position to that shown it is in communication with atmosphere. However, when the solenoid 30 is energized to move the valve 29 to the position shown the compartment 21 is in communication with the inlet through a further passage 31 in the body.

In operation assuming the solenoid valve is de-energised the sleeve 18 moves to cover the port 24 under the action of its spring 23 and air from the inlet flows at a restricted rate between the casing 14 and member 15 to the compartment 20 until this compartment is at inlet pressure. As a result the member 15 is moved to a closed position by the combined action of its spring 22 and the inlet pressure acting on it.

When it is required to re-open the valve the solenoid 30 is energised thereby admitting air at inlet pressure to the compartment 21. As a result the member 15 and sleeve 18 are moved in opposite directions against their springs 22, 23 respectively. Movement of the member 15 opens the valve, whilst movement of the sleeve 18 uncovers the port 24 in the stem and thereby places the compartment 20 in communication with the outlet through the stem. If under these conditions the outlet pressure should exceed the inlet pressure by more than a predetermined amount as determined by the setting of the valves 27, 28 the outlet pressure acting in the compartment 20 assisted by the spring 22 serves to move closure member 15 towards the closed position and thereby reduce the flow through the valve.

In the modification illustrated in FIGURE 3 the casing has a slotted rim which is secured to the body 10, and the stem 10$^b$ is omitted. Moreover, the sleeve 18 has an extension 18$^a$ slidable within a bore in the body 10, and is adapted at the other end to close against an abutment surface 32 within the casing 14 to cut off communication between the compartment 20 and the outlet.

In other respects this modification is similar to the first example described and operates in a similar manner.

The closure members 15 of the valves so far described are arranged to move quickly from the open to the closed positions and vice versa. However, in some instances it is desirable for the valve to open and close slowly (i.e. for example in 20 seconds), and a modification whereby this feature may be achieved expeditiously is illustrated in FIGURES 4 and 5.

The valve shown in FIGURES 4 and 5 may be similar to either of the embodiments described with the following differences.

The solenoid valve 29 is omitted, and the relief valve 28 is arranged both to control the rate of escape of air from the compartment 21 to atmosphere and to determine the rate of flow of air from the valve inlet to the compartment 21. The relief valve 28 comprises a piston axially movable within a ported cylinder 33 in the body. At one end of the piston 28 is a stem 28a on which is formed a head 28b adapted to seat against one end of the cylinder to prevent escape of air to atmosphere through ports 34. When the relief valve is closed the piston covers ports 35 in communication with the main valve inlet through a filter 36 and the passage 31, and the head 28b is removed from its seating to allow air to escape from the compartment 21 to atmosphere. As the relief valve is opened the ports 35 are uncovered and the head 28b moves gradually towards its seating.

Connected to the head 28b is one end of a coiled compression spring 37, the opposite end of which is connected to a slidable abutment 38 bearing against an abutment piece 39 held within a loop formed in the one tangentially extending end of a coiled tension spring 40. The other end of the spring 40 is secured to the longer arm of an L-shaped lever 41 which also bears on a coiled compression spring 42. The shorter arm of the lever 41 is fulcrumed at 43 in a body part 44, and bearing on this arm, at a position between the fulcrum and its junction with the longer arm, is an expansion tube 45. The opposite end of the tube 45 bears against a fixed abutment 46, and surrounding the tube 45 is a sleeve 47 of electric insulating material on which is wound an electric heating element 48.

When the relief valve 28 is closed the main valve is also closed. In order to open the main valve the heating element 48 is energized. As a result the expansion tube 45 expands gradually thereby applying a gradually increasing force through the spring 40 to the spring 37 in a direction to open the relief valve, with the result that the main valve is gradually opened.

In order to close the main valve the heating element 48 is de-energized, and the expansion tube 45 cools gradually thereby allowing the relief valve to close gradually, and permit an increasing rate of escape of air to atmosphere. As a result the main valve closes slowly, by which is meant within a time, for example, 20 seconds.

The air flow control valves as above described are intended for use more particularly for controlling the bleeding of air from the compressor of gas turbine engines, but it may be employed for other uses where it is required to control the pressure at which air is delivered. Further, the valve may be used for controlling gases other than air, and it is to be understood that the term "air" as used herein is intended to include other gases.

Having thus described our invention what we claim as new and desire to secure by Letters Patent is:

1. Valve mechanism for controlling the flow of compressed air or other gas, and comprising in combination a hollow body, an inlet and an outlet rigid with, and extending outwardly from opposite sides respectively of, said hollow body, a cylindrical casing secured to said hollow body, and surrounded by said inlet which is coaxial with, and spaced from, said cylindrical casing, the latter being closed at its end remote from said hollow body, and being open at its other end, a cylindrical member integral wtih said hollow body, and extending therefrom into the open end of said casing in spaced relationship thereto, said cylindrical member being provided with ports for establishing communication between said inlet and said outlet, a first annular piston slidably mounted within said casing so as to divide the interior thereof into two compartments, and provided with a skirt which extends between the open end of said casing and said cylindrical member, and which is movable by said first piston to and from a position in which said ports are covered by said skirt, a first spring acting on said first piston in the direction for causing said skirt to cover said ports, valve means and passages through the medium of which the compartment of said casing nearest to said hollow body is communicatable alternately with said inlet and the ambient atmosphere, a tubular member which is supported by said hollow body and extends through said first annular piston, and which is axially movable between positions in which it interrupts and establishes communication between said outlet and the compartment of said casing furthest from said hollow body, a second annular piston which is rigid with, and extends outwardly from, said tubular member, and which has its outer periphery in slidable engagement with a complementary surface of said cylindrical member, and a second spring acting on said tubular member for moving the latter in a direction opposite to that of movement imparted to said first piston by said first spring so that pressure within the compartment of said casing nearest to said hollow body serves to move said first and second pistons in opposite directions respectively against the actions of said first and second springs for establishing communication between said inlet and said outlet and between the latter and the compartment of said casing furthest from said hollow body, the adjacent cylindrical surfaces of said casing and the skirt of said first piston being disposed to provide between them a restricted annular space through which said inlet is communicatable with the last mentioned compartment of said casing.

2. Valve mechanism according to claim 1, wherein said valve means comprise a solenoid-operable valve and a spring-loaded relief valve in series with each other.

3. Valve mechanism according to claim 1, wherein said valve means comprises a spring-loaded relief valve having operating mechanism including a thermally expansible member, and a heating element surrounding said thermally expansible member.

References Cited in the file of this patent
UNITED STATES PATENTS
2,950,732    Lambert _____ Aug. 30, 1960